(12) United States Patent
Kim et al.

(10) Patent No.: US 7,502,087 B2
(45) Date of Patent: Mar. 10, 2009

(54) IN-PLANE SWITCHING LIQUID CRYSTAL DISPLAY AND DRIVING METHOD THEREOF

(75) Inventors: Do Sung Kim, Gumi-si (KR); Byung Koo Kang, Gumi-si (KR)

(73) Assignee: LG Display Co., Ltd., Seoul (KR)

( * ) Notice: Subject to any disclaimer, the term of this patent is extended or adjusted under 35 U.S.C. 154(b) by 269 days.

(21) Appl. No.: 11/134,280

(22) Filed: May 23, 2005

(65) Prior Publication Data
US 2005/0264744 A1 Dec. 1, 2005

(30) Foreign Application Priority Data
May 31, 2004 (KR) ............... 10-2004-0038854

(51) Int. Cl.
*G02F 1/1343* (2006.01)
(52) U.S. Cl. .................... 349/141; 349/145
(58) Field of Classification Search ........... 349/141, 349/145, 146, 147
See application file for complete search history.

(56) References Cited

U.S. PATENT DOCUMENTS

| | | | |
|---|---|---|---|
| 5,528,395 A * | 6/1996 | So ........................... 349/42 |
| 6,421,039 B1 | 7/2002 | Moon et al. |
| 2001/0015715 A1 * | 8/2001 | Hebiguchi et al. ........... 345/92 |
| 2002/0113936 A1 | 8/2002 | Yanagawa et al. |
| 2002/0158997 A1 | 10/2002 | Fukami et al. |
| 2003/0223028 A1 | 12/2003 | Hirota |
| 2004/0032384 A1 | 2/2004 | Ohta et al. |
| 2004/0056987 A1 | 3/2004 | Song |
| 2004/0125057 A1 * | 7/2004 | Moon et al. ............... 345/87 |
| 2004/0239860 A1 * | 12/2004 | Lee ........................... 349/141 |
| 2005/0078258 A1 | 4/2005 | Kim et al. |
| 2005/0259206 A1 * | 11/2005 | Son ........................... 349/141 |

FOREIGN PATENT DOCUMENTS

| | | |
|---|---|---|
| FR | 2864637 | 7/2005 |
| JP | 10-62802 | 3/1998 |
| JP | 10062802 A * | 3/1998 |
| WO | WO 9808134 | 2/1998 |

OTHER PUBLICATIONS

Communication from French Patent Office.

* cited by examiner

*Primary Examiner*—Michael H Caley
(74) *Attorney, Agent, or Firm*—McKenna Long & Aldridge LLP

(57) ABSTRACT

An in-plane switching LCD including a plurality of gate and data lines crossing each other to define a plurality of pixel areas; a thin film transistor formed at a crossing of the data and gate lines; a pair of common lines facing each other and substantially parallel to the data lines in the pixel areas; a common electrode integrally formed with the common lines, the common electrode being inclined by a predetermined angle; a pair of pixel electrode lines overlapping the common lines; and a pixel electrode integrally formed with the pixel electrode lines, the pixel electrode being inclined substantially parallel to the common electrode, the pixel electrode being arranged in an alternating pattern with the common electrode, wherein the gate lines are formed substantially parallel to the common electrode and the pixel electrode.

12 Claims, 5 Drawing Sheets

IN-PLANE SWITCHING LIQUID CRYSTAL DISPLAY AND DRIVING METHOD THEREOF

This application claims the benefit of Korean Patent Application No. 2004-38854, filed on May 31, 2004, which is hereby incorporated by reference for all purposes as if fully set forth herein,

BACKGROUND OF THE INVENTION

1. Field of the Invention

The present invention relates to an in-plane switching (IPS) liquid crystal display and driving method thereof. More particularly, the present invention relates to an IPS liquid crystal display and a driving method thereof that can provide an improved opening ratio and reduced power consumption.

2. Discussion of the Related Art

Demand for a flat panel display device (of thin, small and lightweight), which can be applied to a television as well as various portable electronic devices such as a mobile phone, a personal digital assistant (PDA), and a notebook computer, has been recently increased. Various display devices, such as a liquid crystal display (LCD), a plasma display panel (PDP), a field emission display (FED), and a vacuum fluorescent display (VFD), have been actively studied for use as a flat panel display device.

Of them, the thin, small and lightweight LCD is being spotlighted as the flat panel display device because it can provide a high-resolution image and low power consumption.

The LCD includes a liquid crystal panel for displaying an image, and a driving unit for applying a driving signal to the liquid crystal panel. The liquid crystal panel includes first and second substrates assembled to each other, and a liquid crystal layer injected between the first and second substrates.

Generally, the first substrate (or a TFT substrate) includes a plurality of gate lines arranged to be spaced apart from one another by a predetermined interval in one direction, a plurality of data lines arranged to be respectively perpendicular to the gate lines, a plurality of pixel electrodes arranged in a matrix shape in respective pixel areas defined by the gate lines and the data lines, and a plurality of TFTs turned on by signals of the gate lines to thereby transfer signals of the data lines to the respective pixel electrodes.

The second substrate (or a color filter substrate) includes a black matrix layer for intercepting light from portions other than the pixel areas, an R/G/B color filter layer for reproducing color, and a common electrode for reproducing an image. In the IPS LCD, the common electrode is formed on the first substrate.

The first and second substrates are assembled to each other. Thereafter, liquid crystal is injected between the assembled first and second substrates.

Meanwhile, the LCD is driven using the optical anisotropy and polarizability properties of liquid crystal.

The liquid crystal has directionality in a molecular arrangement because it has a thin and long structure. The molecular arrangement direction of the liquid crystal can be artificially controlled by applying an electric field to the liquid crystal.

Accordingly, if the arrangement direction of the liquid crystal molecules is changed arbitrarily, the arrangement of the liquid crystal molecules is changed and the light polarized due to the optical anisotropy is modulated arbitrarily. In this manner, the image information is expressed.

The LCD has various display modes based on the arrangement of the liquid crystal molecules. Among them, a TN LCD is widely used because it can easily display white/black color and has a fast response speed and a low driving voltage. In the TN LCD, when a voltage is applied, liquid crystal molecules aligned parallel to a substrate are aligned almost perpendicular to the substrate. Accordingly, when a voltage is applied, a viewing angle becomes narrow due to the refractive anisotropy.

In order to solve this problem, various modes having wide viewing angle characteristics have been proposed. Among them, an In-Plane Switching (IPS) LCD has been developed.

When a voltage is applied, the IPS LCD forms a horizontal electric field on the plane and aligns liquid crystal molecules on the plane, thereby improving the viewing angle characteristic.

FIG. 1 is a sectional view of a related art IPS LCD.

In FIG. 1, a pixel electrode 12 and a common electrode 13 are formed in the same plane on a lower substrate The lower substrate 11 is bonded with an upper substrate 15 with a predetermined space therebetween. A liquid crystal layer 14 is formed between the lower substrate 11 and the upper substrate 15. The liquid crystal layer 14 operates due to a horizontal electric field formed between the pixel electrode 12 and the common electrode 13 on the lower electrode 11.

FIGS. 2A and 2B illustrate a change in the liquid crystal when a voltage is on/off in the IPS LCD.

As can be seen from FIG. 2A, a phase change of the liquid crystal 14 does not occur in the off-state, i.e., when no horizontal electric field is applied to the pixel electrode 12 or the common electrode 13. For example, the liquid crystals are twisted at 45° from a horizontal direction of the pixel electrode 12 and the common electrode 13.

As can be seen from FIG. 2B, a phase change of the liquid crystal layer occurs in the on-state, i.e., when a horizontal electric field is applied to the pixel electrode 12 or the common electrode 13. When compared with the off-state of FIG. 2A, the twist angle is about 45° and the twist direction of the liquid crystals coincides with the horizontal direction of the pixel electrode 12 and the common electrode 13.

As described above, the IPS LCD has both the pixel electrode and the common electrode on the same plane.

The IPS LCD has an advantage of a wide viewing angle. That is, when the LCD is seen from the front, the viewing angle is at 70° in up/down/right/left directions.

Also, compared with a general LCD, a fabricating process is simple and a movement of color depending on the viewing angle is slight.

However, since the common electrode and the pixel electrode are formed on the same plane, the transmission rate and the aperture ratio are reduced.

FIG. 3 is a plan view of a related art IPS LCD.

In FIG. 3, a plurality of gate lines 32 are arranged at regular intervals in one direction. A plurality of data lines 35 are arranged at regular intervals in a direction perpendicular to the gate lines 32 so as to define pixel areas P on a transparent lower substrate 31.

A common line 39 is arranged parallel to the gate lines 32 within the pixel area P. A thin film transistor T is formed at each pixel area P defined by the crossing of the gate line 32 and the data line 35.

Here, the thin film transistor T includes a gate electrode 32a protruded from the gate line 32, a gate insulating layer (not shown) formed at a front of the lower substrate 31, an active layer 34 formed on the gate insulating layer disposed at an upper portion of the gate electrode 32a, a source electrode 35a protruded from the data line 35, and a drain electrode 35b spaced apart from the source electrode 35a by a predetermined distance.

A plurality of pixel electrodes 38 are formed parallel to the data line 35 within the pixel area P. One terminal of the pixel electrode 38 is connected to the drain electrode 35b of the thin film transistor T. Also, a plurality of common electrodes 39a protruded from the common line 39 are formed within the pixel area P.

A shield electrode 36 is formed between the common electrodes 39a adjacent to the data line 35 so as to prevent distortion of an electric field.

More specifically, when a scan signal is applied to the thin film transistor T through the gate line, the thin film transistor T is turned on so that an image signal is input to the pixel electrode 38 through the data line 35. Then, an electric field is formed between the common electrode 39a and the pixel electrode 38 in a direction substantially horizontal to the substrate. The liquid crystal molecules rotate in the direction of the electric field.

However, when the image signal is input to the pixel electrode 38, the electric field is formed not only between the common electrode 39a and the pixel electrode 38 but also between the pixel electrode 38 and the data line 35.

At this time, the electric field between the pixel electrode 38 and the data line 35 distorts the entire horizontal electric field within the pixel. Therefore, the liquid crystal molecules are not arranged completely horizontal with respect to the substrate. Consequently, crosstalk occurs in a vertical direction.

The change of the electric field effects the rotation of the liquid crystals such that color tone is changed. In order to prevent this problem, a shield electrode 36 for shielding the electric field is formed between the data line 35 and the common electrode 39a and between the data line 35 and the pixel electrode 38.

For the formation of the shield electrode 36, a width of the common electrode 39a should be 10 μm or more.

Accordingly, as the width of the common electrode is widened due to the formation of the shield electrode, the aperture ratio of the pixel area is reduced.

SUMMARY OF THE INVENTION

Accordingly, the present invention is directed to an IPS liquid crystal display and a driving method thereof that substantially obviates one or more problems due to limitations and disadvantages of the related art.

An advantage of the present invention is to provide an IPS liquid crystal display and a driving method thereof, which can improve a opening ratio by arranging a pixel electrode, a common electrode, and a gate line to be substantially parallel to one another and to be inclined by a predetermined angle, and can reduce power consumption by using a column inversion method according to pixel rows.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the invention, as embodied and broadly described herein, an in-plane switching liquid crystal display comprising: a plurality of gate lines and a plurality of data lines crossing each other to define a plurality of pixel areas; a thin film transistor formed at a crossing of the data and gate lines; a pair of common lines facing each other and substantially parallel to the data lines in the pixel area; a common electrode integrally formed with the common lines, the common electrode being inclined by a predetermined angle; a pair of pixel electrode lines overlapping the common lines; and a pixel electrode integrally formed with the pixel electrode lines, the pixel electrode being inclined substantially parallel to the common electrode, the pixel electrode being arranged in an alternating pattern with the common electrode, wherein the gate lines are formed substantially parallel to the common electrode and the pixel electrode.

In another aspect of the present invention, there is provided a method for driving an in-plane switching liquid crystal display, the method including: sequentially applying a data signal to data lines; and sequentially applying a scan signal to gate lines, wherein voltages of a different polarity are alternately applied to pixel areas of a liquid crystal panel.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE ILLUSTRATED EMBODIMENTS

Reference will now be made in detail to embodiments of the present invention, examples of which are illustrated in the accompanying drawings. Wherever possible, the same reference numbers will be used throughout the drawings to refer to the same or like parts.

Figure 1:
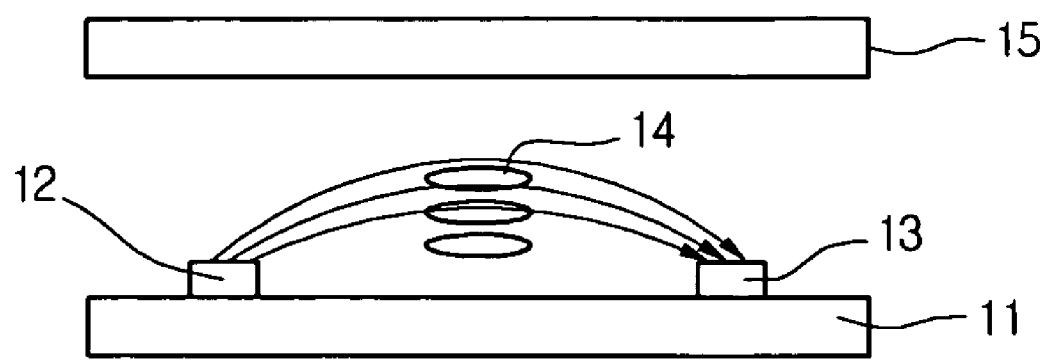
FIG. 1 is a schematic sectional view of a general IPS LCD.
Figure 2A:
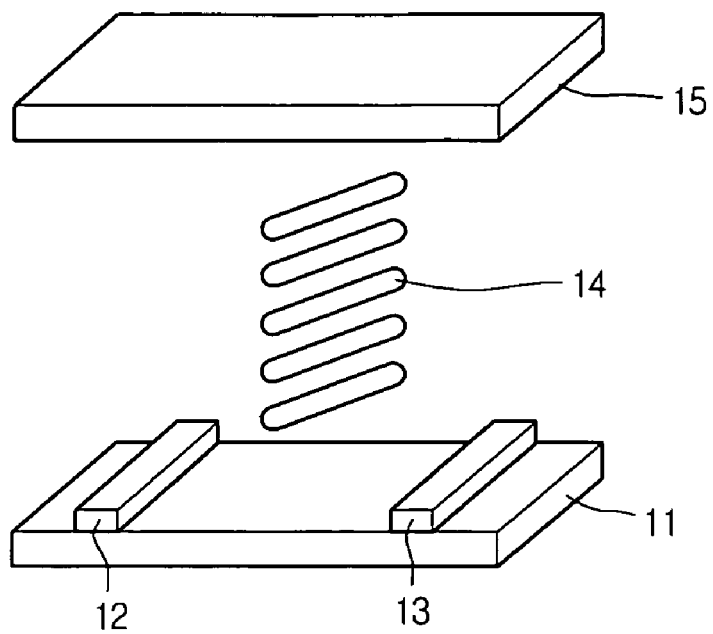
FIGS. 2A and 2B are views illustrating a change of liquid crystal when an IPC LCD is turned on or off.
Figure 2B:
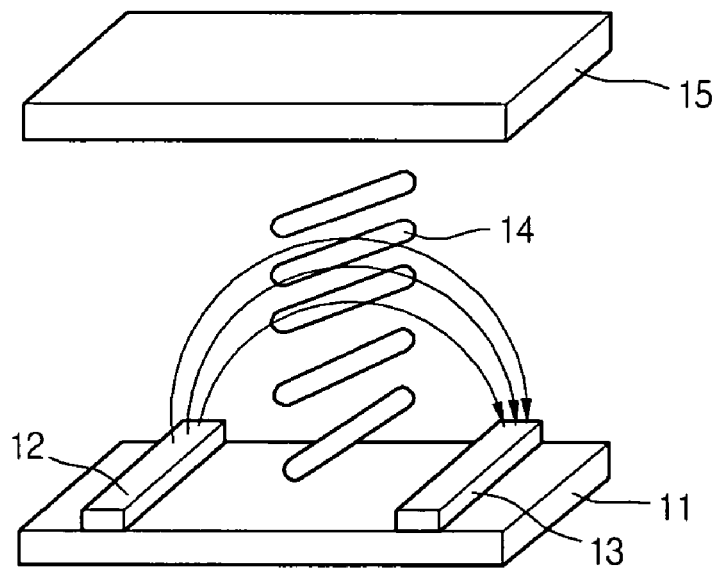
Figure 3:
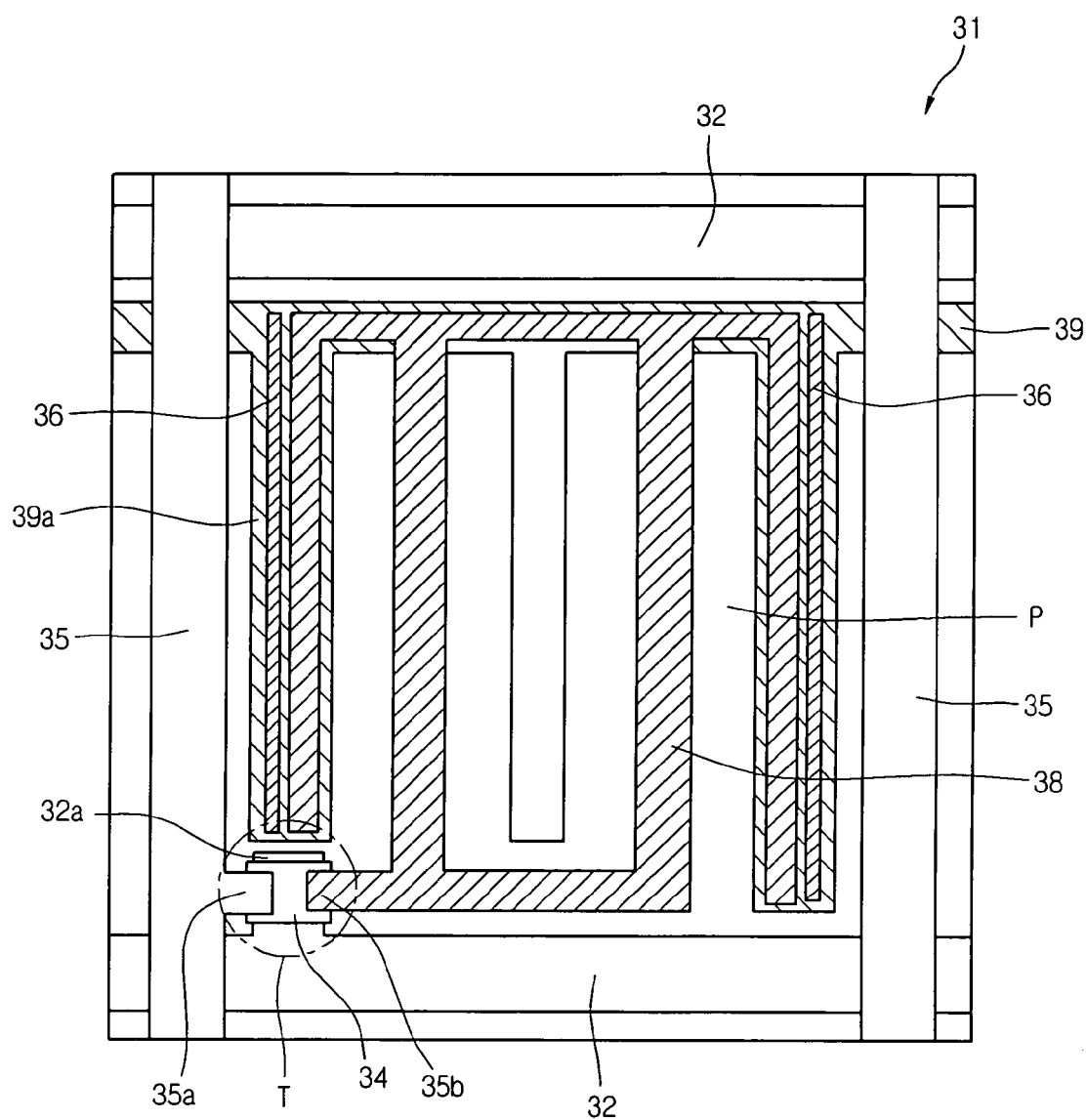
FIG. 3 is a plan view of a related art IPS LCD.
Figure 4:
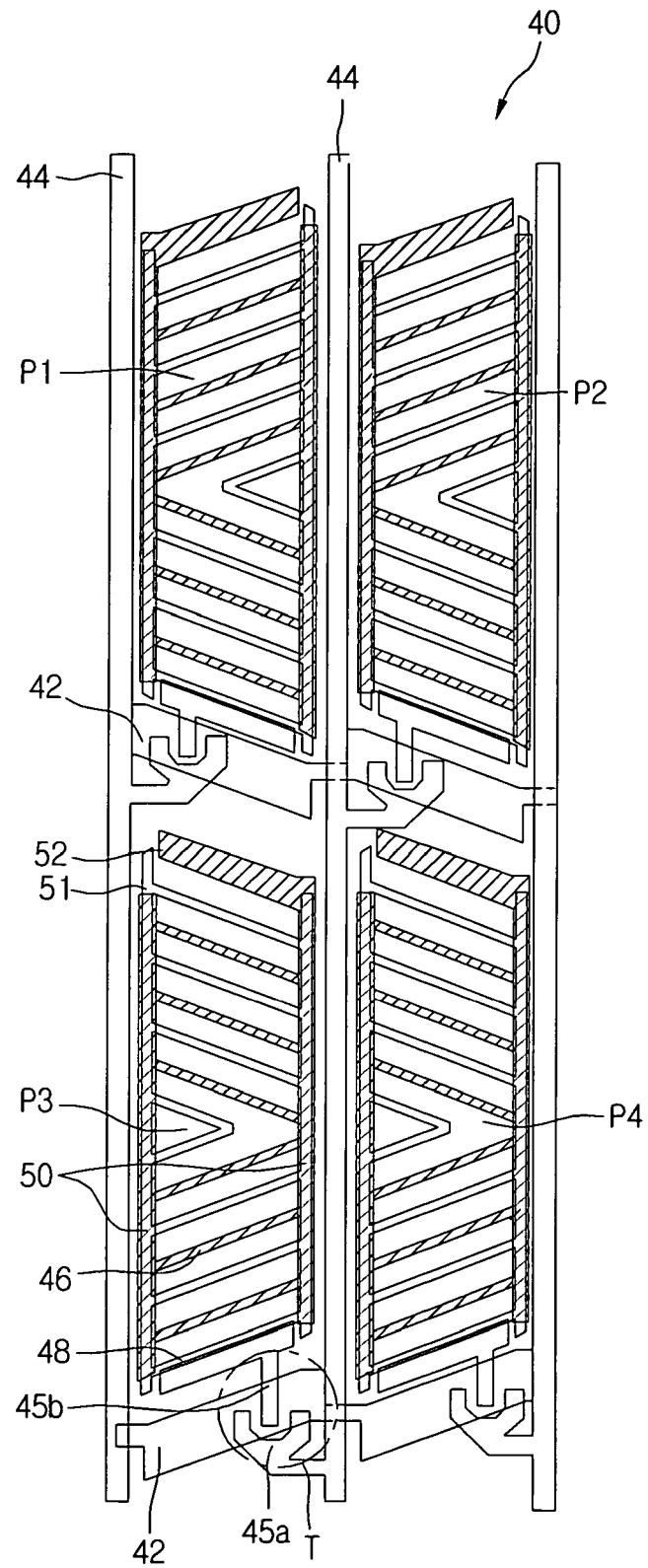
FIG. 4 is a schematic plan view of an IPS LCD according to the present invention.
Figure 5:
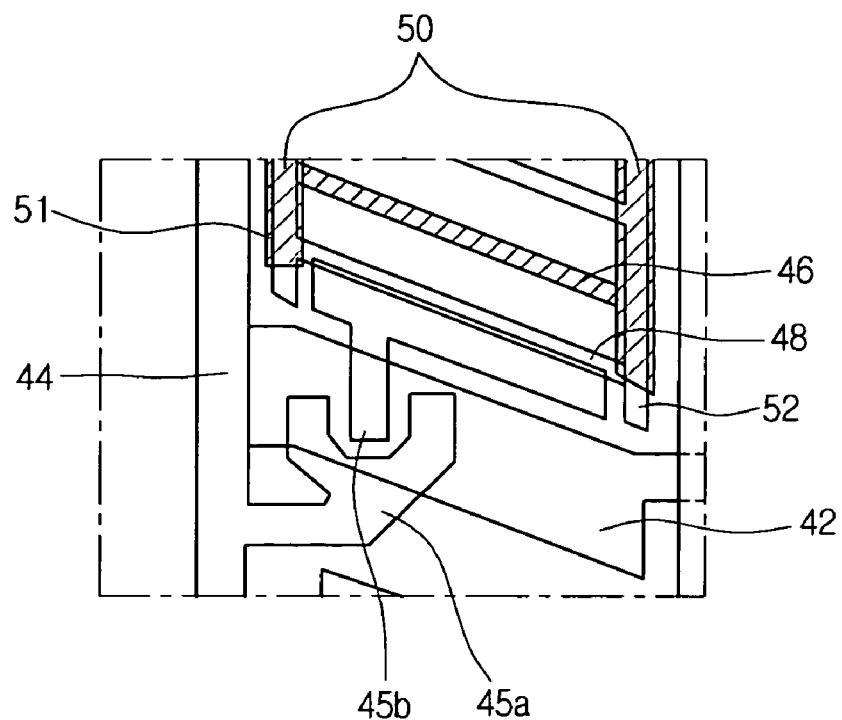
FIG. 5 is an enlarged plan view of a circled-block region of a pixel area shown in FIG. 4.

FIG. 4 is a schematic plan view of an IPS LCD according to the present invention, and FIG. 5 is an enlarged plan view of a circled block region of a pixel area shown in FIG. 4.

In FIGS. 4 and 5, in order to define pixel areas in an IPS LCD of the present invention, a plurality of vertical data lines 44 are spaced apart from one another by a predetermined interval, and a plurality of gate lines 42 are arranged to be inclined by a predetermined angle with respect to the data lines 44.

A TFT "T" is formed in respective pixel areas P1 to P4 defined by crossings of the data lines 44 and the gate lines 42. The TFT may be disposed at a left or right side of the pixel area according to pixel columns.

That is, source electrodes 45A connected to one data line 44 are alternately provided in right and left pixel areas with respect to the data line 44.

Also, a common line 51 and a pixel electrode line 52 are arranged substantially parallel to the data line 44 at a position neighboring the data line 44 in the pixel area. The common line 51 and the pixel electrode line 52 are formed to have a width of about 8 μm or below.

Also, the common line 51 and the pixel electrode line 52 overlap with each other and thus forms a storage capacitance in each pixel area.

First and second electrodes protrude from the common line 51 and the pixel electrode line 52, and are arranged substantially parallel to the gate line 42. The first electrode and the second electrode correspond respectively to a common electrode 46 and a pixel electrode 48.

The common electrode 46 and the pixel electrode 48 maybe inclined upward or downward with respect to a horizontal center line of the pixel area, whereby a wide viewing angle can be achieved.

In addition, the gate line 42 is are arranged substantially parallel to the common electrode 46 and the pixel electrode 48, whereby an opening ratio is improved.

In FIG. 5, the TFT includes a gate electrode (not shown) extended from the gate line 42, a semiconductor layer (not shown) formed on the gate electrode, a source electrode 45A formed on the semiconductor layer and extended from the data line 44, and a drain electrode 45B. A scan signal is applied to the gate electrode and the semiconductor layer is activated by the scan signal to thereby form a channel layer. An image signal is applied to the source electrode 45A.

The common electrode 46 and the pixel electrode 48 are arranged to incline by a predetermined angle with respect to a horizontal direction substantially perpendicular to the data line 44, and the gate line 42 is arranged substantially parallel to the common electrode 46 and the pixel electrode 48. Here, the inclination angle is below about 45°.

When the common electrode 46, the pixel electrode 48, and the gate line 42 are arranged to incline as above, liquid crystal can be aligned horizontally (0°).

Since the direction of an electric field generated between the data line 44 and the neighboring common electrode 46 is identical to the alignment direction of the liquid crystal, a distortion is not generated due to an electric field generated from the data line 44.

Accordingly, an opening ratio of the pixel area can be improved because a separate shield electrode and a black matrix for shielding an undesirable electric field are unnecessary.

Also, when the gate line 42 is not perpendicular to the data line 44 but is arranged to be inclined by a predetermined angle with respect to the horizontal direction, the opening ratio can be improved because the interval between the gate line 42 and the neighboring pixel electrode 48 can be maintained at a constant value (for example about 10 μm).

When the pixel electrode 48 and the common electrode 46 are arranged to be inclined and the gate line 42 is horizontally arranged, an interval between the gate line 42 and the pixel electrode 48 is not constantly maintained.

Accordingly, a region where the above interval is above about 10 μm exists in one pixel area. Since such an undesirable region cannot be used as a region for effectively transmitting light, the opening ratio is reduced.

However, the gate line 42 is arranged substantially parallel to the pixel electrode 48 and the common electrode 46 in the present invention. That is, an interval between the gate line 42 and the pixel electrode 48 is constantly maintained. Accordingly, since a region where the above interval is above about 10 μm does not exist in one pixel area, the opening ratio can be improved.

Here, the above interval is not limited to about 10 μm, but may be varied according the size and image resolution of a liquid crystal panel.

Also, since the gate line 42 is symmetrically inclined with respect to the front gate line 42, an opening region of the pixel area can be further widen.

Meanwhile, the common electrode 46 is connected to the common line 51 arranged near the neighboring pixel, and the pixel electrode 48 is connected to the pixel electrode line 52 overlapping with the common line 51.

The common line 51 and the pixel electrode line 52 overlap with each other to thereby form a storage capacitor 50 for use as a storage electrode.

The storage capacitor 50 is used to improve the retention property of a voltage applied to liquid crystal and stability in gradation reproduction, and to reduce a flicker and an after-image.

Figure 6:
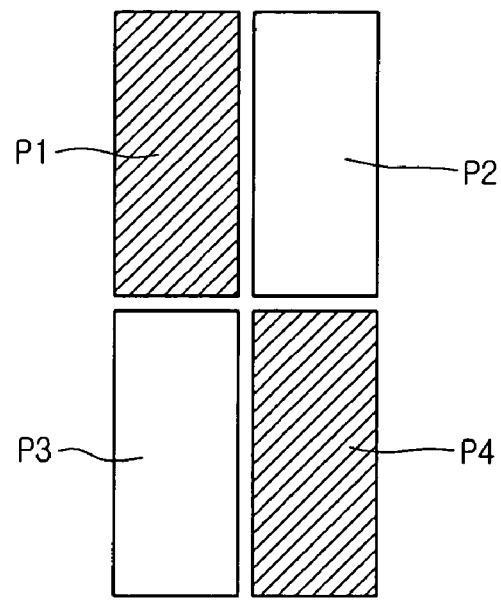
FIG. 6 is a view illustrating a case where a pixel row of an inventive IPS LCD is driven when a signal is applied to the pixel row.

FIG. 6 is a view illustrating a pixel row of an inventive IPS LCD driven when a signal is applied to the pixel row.

In FIG. 6, a TFT formed at a portion where the gate line and the data line cross each other may be arranged at the left or right side of a pixel area according to pixel columns.

In detail, since the TFT may be arranged at the left or right side of a corresponding pixel area according to pixel columns, each TFT receives a signal according to the polarity applied thereto.

When data signals are sequentially applied to the first and second data lines according to a column inversion method, a data signal is applied to each pixel area connected to a source electrode of the first data line (See a pixel structure in FIG. 4).

Since two data lines can apply data signals respectively to pixel areas formed along one column in a zigzag pattern, the pixel areas corresponding to a vertical direction of the data lines is alternately turned on/off.

A turned-off pixel area is turned on by a data signal supplied from the neighboring data line.

Accordingly, as shown in FIG. 6, pixel areas driven by a column inversion method are driven as in a dot inversion method.

When data signals are sequentially applied to two data lines and on/off signals are sequentially applied to gate lines, a voltage higher than that of a common electrode is applied to a pixel area P1 connected to the first data line, and a voltage lower than that of the common electrode is applied to a neighboring pixel area P2 because a data signal is not applied thereto.

Likewise, when an on/off driving signal is applied to the next gate line, a voltage lower than that of the common electrode is applied to the pixel area P2 because a data signal is not applied thereto, and a voltage higher than that of the common electrode is applied to the pixel area P4 because a data signal is applied thereto.

As described above, in the inventive IPS LCD, the pixel electrode, the common electrode, and the gate line are arranged substantially parallel to one another, whereby an opening ratio can be improved.

Also, a dot inversion method may be implemented using a column inversion method where a TFT is disposed at a left or right side of a pixel area according to pixel columns, whereby power consumption can be reduced.

It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

What is claimed is:

1. An in-plane switching liquid crystal display comprising:
   a plurality of gate lines and a plurality of data lines crossing each other to define a plurality of pixel areas, the data lines having a straight line respectively;
   a thin film transistor formed at a crossing of the data and gate lines, wherein each thin film transistor is alternately disposed on a left pixel area and a right pixel area of the data line according to a pixel column to have a zigzag shape, the pixel column including the pixel areas parallel to the data line;
   a pair of common lines facing each other and substantially parallel to the data lines in the pixel areas;
   a common electrode integrally formed with the common lines, the common electrode being inclined by a predetermined angle;
   a pair of pixel electrode lines overlapping the common lines and substantially parallel to the common lines; and
   a pixel electrode integrally formed with the pixel electrode lines, the pixel electrode being inclined substantially parallel to the common electrode, the pixel electrode being arranged in an alternating pattern with the common electrode,
   wherein the common electrode and the pixel electrode each is symmetrically inclined with respect to a center line of the pixel area, the center line being a direction perpendicular to the data line, and
   wherein the gate lines are formed substantially parallel to the common electrode and the pixel electrode in each pixel area.

2. The display according to claim 1, wherein the gate lines are inclined substantially parallel to the common electrode and the pixel electrode, wherein an aperture ratio is increased at the crossing of the data and gate lines.

3. The display according to claim 1, wherein the common electrode inclines upward in a upper pixel area of the center line and inclines downward in a lower pixel area of the center line.

4. The display according to claim 1, wherein the pixel electrode inclines upward in a upper pixel area of the center line and inclines downward in a lower pixel area of the center line.

5. The display according to claim 1, wherein a storage capacitance is formed in a region Where the common lines and the pixel electrode lines overlap with each other.

6. The display according to claim 1, wherein the gate lines, the common electrode, and the pixel electrode are arranged to incline by a same angle and to be substantially parallel to one another in the pixel areas.

7. The display according to claim 1, wherein the gate lines, the common electrode, and the pixel electrode are arranged to incline by an angle of below about 45° with respect to the center line.

8. The display according to claim 1, wherein the common lines are formed to have a width of about 8 μm or below.

9. The display according to claim 1, wherein distances of the gate lines extend from each other so as to widen an opening area of each pixel area.

10. The display according to claim 1, wherein pixel electrodes are spaced apart from each other by a predetermined interval in the pixel areas.

11. The display according to claim 10, wherein the pixel electrodes are spaced apart from each other by a predetermined interval of about 10 μm in the pixel areas.

12. The display according to claim 1, wherein the pixel areas include the thin film transistors display image of dot inversion type in response to data signals of column inversion type.

* * * * *